June 12, 1956  J. J. CURRY  2,749,616
DENTAL MATRIX UNIT
Filed Oct. 15, 1954  2 Sheets-Sheet 1
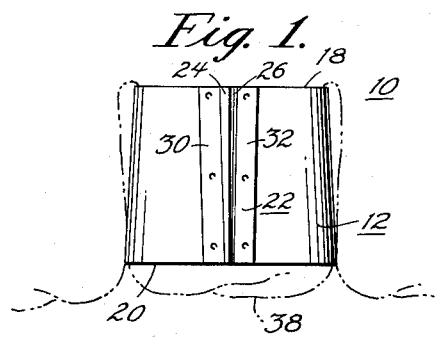
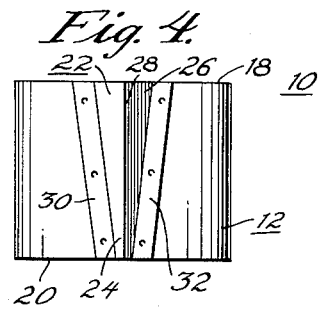
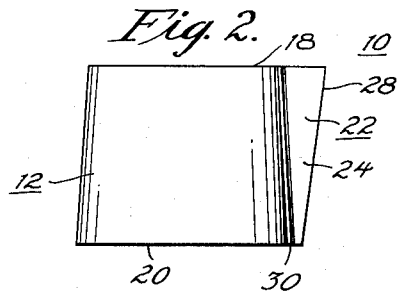
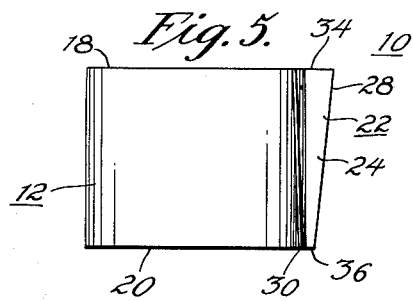
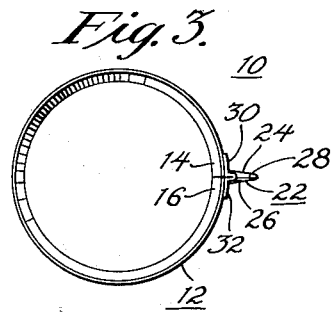
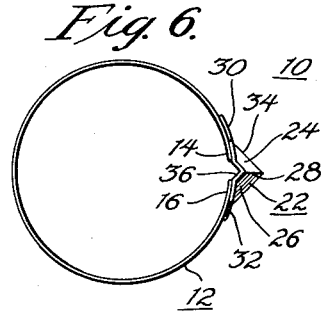
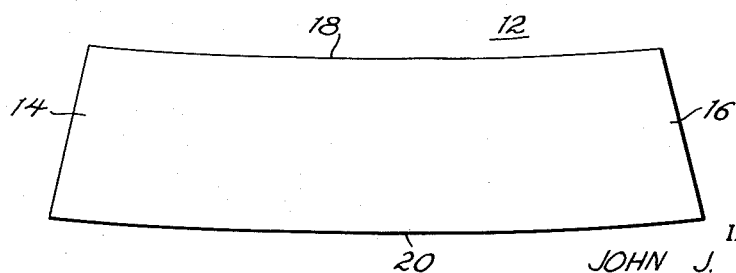
INVENTOR.
JOHN J. CURRY
BY
Jacob Trachtman
ATTORNEY June 12, 1956  J. J. CURRY  2,749,616
DENTAL MATRIX UNIT
Filed Oct. 15, 1954  2 Sheets-Sheet 2
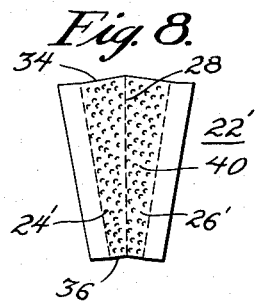
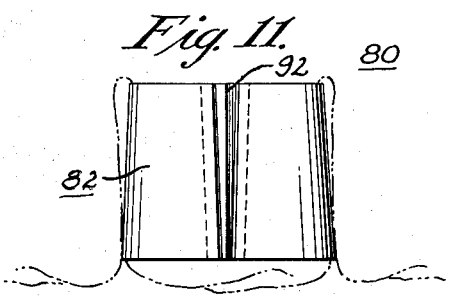
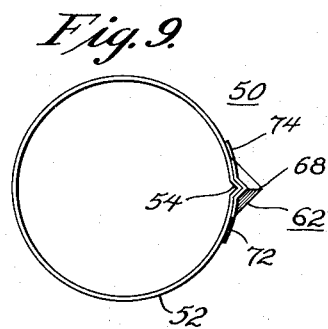
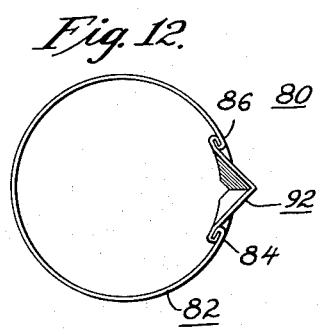
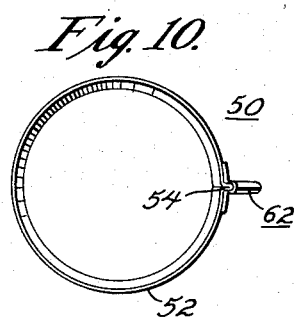
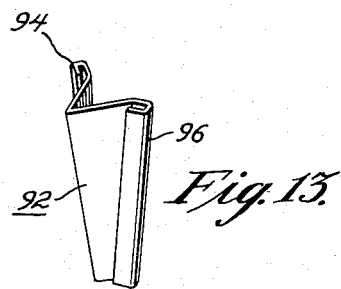
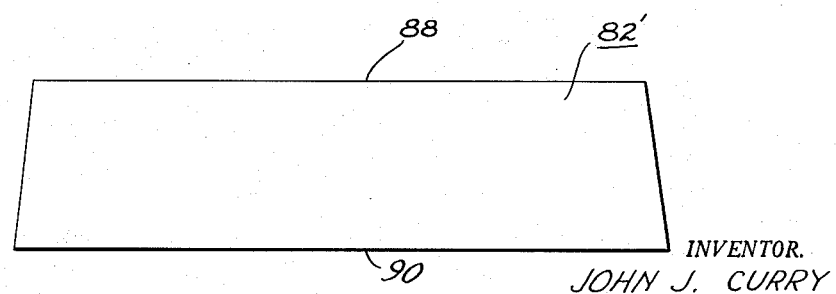
INVENTOR.
JOHN J. CURRY
BY Jacob Trachtman
ATTORNEY.

United States Patent Office 2,749,616
Patented June 12, 1956

2,749,616

DENTAL MATRIX UNIT

John J. Curry, Philadelphia, Pa.

Application October 15, 1954, Serial No. 462,453

16 Claims. (Cl. 32—63)

This invention relates to a dental matrix device and method of applying same about a tooth, and more particularly to a dental matrix device provided with means for clamping a matrix band about a tooth and the method of clamping same.

It is the primary object of this invention to provide a new and improved dental matrix device which may be easily and readily applied and removed from a tooth.

Another object of the invention is to provide a new and improved dental matrix device provided with means for securely clamping a matrix band about the entire side wall circumference of a tooth.

Still another object of the invention is to provide a new and improved dental matrix device conforming more closely with the side walls of a tooth.

Yet another object of the invention is to provide a new and improved dental matrix device which is simple in construction and operation and inexpensive to construct.

A further object of this invention is to provide a new and improved dental matrix device which does not require the use of special tools for application and removal.

Yet a further object of the invention is to provide a new and improved dental matrix device which is more readily applied to any tooth irrespective of its position within the mouth.

Still a further object of the invention is to provide a new and improved dental matrix device which may be conformed at its lower and upper edges to the gum and crown of the tooth respectively without interfering with its operation.

Another object of the invention is to provide a new and improved dental matrix device which may be applied to a tooth with a minimum of discomfort to a patient.

Still another object of the invention is to provide a new and improved dental matrix device which is designed for use only one time by applying and clamping it about a tooth, after which use it is discarded.

Yet another object of this invention is to provide a new and improved dental matrix device which is efficient in operation and rugged in construction.

A further object of the invention is to provide a new and improved dental matrix device which is applicable to an appreciable range of tooth diameters.

Still a further object of the invention is to provide a new and improved method of applying a dental matrix device which is easily and efficiently carried out.

Yet a further object of the invention is to provide a new and improved method of applying a dental matrix device which may be carried out with a minimum of discomfort to a patient.

Another object of the invention is to provide a new and improved method of applying a dental matrix device which allows the device to conform closely to the tooth about which it is applied.

The foregoing is attained as well as other objects by providing a dental matrix device comprising a flexible band member and a collapsible retaining element connected with the band member and being contractibly deformable for contracting and clamping the band member about a tooth.

The method provided by the invention comprises the steps of selecting one of the matrix devices which is easily received over the tooth, trimming the top and bottom edges of the device to conform with the gum line and crown of the tooth, positioning the device about the tooth, and then applying a compressive force to contractibly deform the retaining element of the device contracting its band member to a greater extent along its top edge than along its bottom edge producing a conical section conforming with the walls of said tooth and clamping said device about said tooth.

The above objects of the invention as well as many others will become apparent when the following description of the invention is read in conjunction with the drawings in which:

Figure 1 is a front elevational view of the dental matrix device embodying the invention applied to a tooth which is shown by dashed lines, Figure 2 is a side elevational view of the device shown in Figure 1, Figure 3 is an inverted plan view of the device shown in Figure 2, Figure 4 is a front elevational view of the device prior to the deformation of its retaining element, Figure 5 is a side elevational view of the device shown in Figure 4, Figure 6 is an inverted plan view of the device shown in Figure 5, Figure 7 is a plan view of the matrix band blank which is formed in making the dental matrix device, Figure 8 is a plan view of the retaining element blank which is formed in making the dental matrix device, Figure 9 is a view similar to that of Figure 6 showing a modified form of device utilizing a ring band member.

Figure 10 is a view similar to that of Figure 9 showing the device with its retaining element collapsibly deformed.

Figure 11 is a front elevational view illustrating another modified form of the dental matrix device as applied to a tooth which is shown by dashed lines, Figure 12 is a plan view of the device shown in Figure 11, Figure 13 is a perspective view of the retaining element shown in Figure 12, and Figure 14 is a plan view of the matrix band blank formed in making the modified form of dental matrix device shown in Figure 11.

Like reference numerals designate like parts throughout the several views.

Refer now to the Figures 1 to 8 inclusive for a detailed description of the dental matrix device 10 embodying the invention. The dental matrix device 10 comprises a flexible band member 12 having first and second terminal portions 14, 16, and top and bottom edges 18, 20. The band member 12 is preferably made of thin gage stainless steel which is highly flexible as well as having other desirable properties.

The dental matrix device 10 also comprises a collapsible retaining element 22 with first and second legs 24, 26 which are joined together to form an apex 28. The legs 24, 26 are respectively provided with end portions 30, 32 which are secured with respective terminal portions 14, 16 of the flexible band member 12 by spot welding or by any other suitable method.

In this manner the retaining element 22 engages a flexible band member 12 by having the end portions 30, 32 of its legs secured in the direction along the band member, while the retaining element 22 extends between the top and bottom edges 18, 20 of the band member 12, the top and bottom edges 34, 36 of the element 22 coinciding with the top and bottom edges 18, 20 of the band member 12.

The Figures 4, 5 and 6 illustrate the device 10 before it is clamped about a tooth and shows the retaining element 22 with a substantially V-shaped cross-section along the band member 12. The leg dimensions of this section when taken along the top edge of the retaining element 22 are greater than when taken along the bottom edge 36. The sectional dimensions gradually decrease in moving from the top edge 34 to the bottom edge 36 (see Figure 6). In this connection it is also noted that the distance between the end portions 30, 32 gradually decreases from the top edge 34 to the bottom edge 36 of the retaining element 22.

This form of the retaining element 22 is produced from the retaining element blank 22' which is provided with tapering leg segments 24' and 26'.

Since the retaining element 22 is provided with a greater distance between the end portions 30, 32 of its legs 24, 26 along its top edge 34 than along its bottom edge 36, the top edge 18 of the band member 12 may be provided with a shorter length than that of its bottom edge 20. Figure 7 also illustrates the edges of the band blank member 12' to be arcuate. This construction provides a device 10 which retains its band member 12 to form a substantially cylindrical section as illustrated by Figures 4, 5 and 6. In this cylindrical form, a device 10 of appropriate size may easily be placed over a tooth and positioned about it preparatory to clamping the device 10. As will later become evident, a particular device 10 may accommodate any tooth within a given range of tooth diameter sizes.

At this time the upper and lower edges of the device 10 may be trimmed and contoured to conform with the gum line and crown of the particular tooth to be treated. This is easily accomplished by removing and replacing the device 10 as required.

The Figure 1 illustrates a dental matrix device 10 which has been positioned about and clamped to a tooth 38 shown by dashed lines. The matrix device 10 is clamped about the tooth 38 by contractibly deforming the retaining element 22 by applying compressive force to the outer surfaces of the legs 24, 26. This may be effected by the use of ordinary pliers in which case the outer surfaces of the element may be dimpled or roughened as shown at 40 in Figure 8 to facilitate gripping.

As clearly seen in Figure 3, when the retaining element 22 is completely collapsed, the legs 24, 26 contact each other along the inner surfaces with their end portions 30, 32 in abutting relationship. This causes the flexible band member 12 to assume a configuration which is substantially a conical section. The conical configuration is desirable since it allows the band member to more closely conform with the configuration of the walls of the tooth which taper in the direction towards the gum line. The conical form of the band member 12 also reduces the possibility of movement towards the crown and loosening or accidental removal of the device 10. Good retention is important when the device is to be worn over an extended period of time.

Although the retaining element 22 is illustrated as fully collapsed by Figures 1, 2 and 3, the degree of contractible deformation will depend on the relative sizes of the diameters of the tooth to be treated and of the matrix device 10. The amount of contractible deformation of the retaining element 22 will determine the range of tooth sizes about which the device 10 may be clamped. The range of sizes which can be accommodated by a particular device 10 increases its utility and reduces the number of different sizes of devices 10 required for various applications.

It is also noted that since the retaining element 22 may be deformed in different amounts along its upper and lower edges 34, 36, the conical tapering of the flexible band member 12 may be varied to conform to the particular taper of the tooth to which the device 10 is applied.

In order that the device 10 may be effectively clamped about a tooth, it is important that the retaining element 22 be made of a suitable material. Stainless steel, of sufficient thickness for exerting and maintaining a clamping tension upon the band member 12 when it is deformed, has been found satisfactory. Of course any other material having like properties may be utilized. The properties of rigidity and inflexibility of a material are desirable for maintaining the element 22 in its preformed and deformed configurations, while plastic and ductile properties of the material allow permanent deformation without fracturing.

The method of applying a dental matrix device comprises the steps of selecting a dental matrix device of the type described which is of a size appropriate for the tooth about which it is to be clamped. The top and bottom edges of the device are then trimmed to conform with the gum line and crown of the tooth by fitting the device over the tooth and removing same as required. With the top and bottom edges of the device appropriately trimmed and placed about the tooth, the retaining element of the device is contractibly deformed by the application of a compressive force thereto. The band member is contracted to a greater extent along its top edge than along its bottom edge to produce a conical section conforming with the walls of the tooth and clamping the device about the tooth.

When the compressive deforming force is removed from the retaining element 22, the retaining element maintains its deformed configuration which maintains the clamping force upon the band member of the device.

The clamping device 10 may be readily removed by cutting the retaining element 22 from its upper edge 34 to its lower edge 36 along its apex 28.

The Figures 9 and 10 illustrate a dental matrix device 50 which is a modified form of the device 10. It will be readily evident that the description given in connection with the device 10 will in many respects be applicable to the device 50.

The device 50 comprises a flexible band member 52 which is in the form of a continuous ring. The ring band member 52 may be provided with an indentation 54 which is received within the collapsible retaining element 62. The band member 52 may be secured with the element 62 by spot welding it at 54 to the apex 68 of the element 62. Attachment in this manner may be easily and quickly accomplished. However the ring band member and the retaining element 62 also may be secured together in any other suitable manner. The band member 52, for example, may be secured with the leg end portions 72, 74 of the retaining element 62 in the manner described in connection with the device 10.

The Figure 10 discloses the device 50 with its retaining element 62 in its fully contracted form, the indented portion 54 of the ring band member 52 being compressed within it. When the retaining element 62 is deformed, the band member 52 may be unequally contracted along its upper and lower edges to produce a conical section conforming to the walls of the tooth.

The advantages of using a ring band member and securing it to its retaining element in the manner described will be evident in connection with particular design circumstances and methods of manufacturing and processing.

Refer now to Figures 11 to 14 inclusive which illustrate another dental matrix device 80 which is also a modified form of the device 10. It will therefore be obvious that much of the description given in connection with the device 10 will also be applicable to the construction and operation of the device 80.

A flexible band member 82 is provided with terminal portions 84, 86 which have their ends folded back on themselves to form hooks.

A substantially V-shaped retaining element 92 is provided with legs having end portions 94, 96 which are also folded back upon themselves (Figure 13) and respectively engage the terminal ends 84, 86 of the band member 82. The band member 82 and the retaining element 92 may be thus secured together by respectively engaging their terminal and end portions and compressing them or otherwise binding them.

The Figure 14 illustrates the band member blank 82' which has an upper straight edge 88 which is of smaller length than its lower straight edge 90.

The particular advantages of the embodiment of the invention illustrated by the device 80 will be evident when considered under various design circumstances and requirements, and in connection with the manufacturing and processing thereof.

While only a few representative embodiments of the invention disclosed herein have been outlined in detail, there will be obvious to those skilled in the art many modifications and variations accomplishing the foregoing objects and realizing many or all of the advantages, but which yet do not depart essentially from the spirit of the invention.

What is claimed is:

1. A dental matrix device comprising a flexible band member for being received about a tooth, and a substantially V-shaped retaining element connected with said band member and being contractibly deformable for clamping said band member about said tooth.

2. A dental matrix device comprising a flexible band member for being received about a tooth, and a substantially V-shaped retaining element connected with said band member having first and second legs which are contractibly deformable for contracting and clamping said band member about said tooth.

3. A dental matrix device comprising a flexible band member for being received about a tooth having top and bottom edges, and a retaining element connected with said band member and substantially extending between its top and bottom edges and having first and second legs forming a substantially V-shaped cross-section along said band member being contractibly deformable for contracting and clamping said band member about said tooth.

4. A dental matrix device comprising a flexible band member for being received about a tooth having top and bottom edges, and a retaining element connected with said band member and substantially extending between its top and bottom edges and having first and second legs forming a substantially V-shaped cross-section along said band member, said cross-section having decreasing leg dimensions in moving from the top edge to the bottom edge of said band member, the legs of said element being contractibly deformable for contracting the top edge to a greater extent than the bottom edge of said member and clamping said band member about said tooth.

5. A dental matrix device comprising a flexible band member for being received about a tooth, and a substantially V-shaped retaining element connected with said band member at its apex and having first and second legs which are contractibly deformable for contracting and clamping said band member about said tooth.

6. A dental matrix device comprising a flexible band member for being received about a tooth, and a substantially V-shaped retaining element having first and second legs with end portions respectively secured along said band member, the legs of said element being contractibly deformable for contracting and clamping said band member about said tooth.

7. A dental matrix device comprising a flexible band member in the form of a cylindrical ring for being received about a tooth having top and bottom edges, and a substantially V-shaped retaining element connected with said band member at its apex and having first and second legs forming a substantially V-shaped cross-section along said band member, the legs of said element being contractibly deformable for contracting and clamping said band member about said tooth.

8. A dental matrix device comprising a flexible band member in the form of a cylindrical ring for being received about a tooth having top and bottom edges, and a substantially V-shaped retaining element connected with said band member at its apex and substantially extending between its top and bottom edges and having first and second legs forming a substantially V-shaped cross-section along said band member, said cross-section having decreasing leg dimensions in moving from the top edge to the bottom edge of said band member, the legs of said element being contractibly deformable for contracting said band member into a conical section conforming with said tooth and clamping said band member about said tooth.

9. A dental matrix device comprising a flexible band member in the form of a cylindrical ring for being received about a tooth having top and bottom edges, and a retaining element having first and second legs with end portions respectively secured along said band member, said legs forming a substantially V-shaped cross-section along said band member, the legs of said element being contractibly deformable for contracting and clamping said band member about said tooth.

10. A dental matrix device comprising a flexible band member in the form of a cylindrical ring for being received about a tooth having top and bottom edges, and a retaining element substantially extending between the top and bottom edges of said band member and having first and second legs with end portions respectively secured along said band member, said legs forming a substantially V-shaped cross-section along said band member with decreasing sectional leg dimensions in moving from the top edge to the bottom edge of said band member, the legs of said element being contractibly deformable for contracting said band member into a conical section conforming with said tooth and clamping said band member about said tooth.

11. A dental matrix device comprising a flexible band member for being received about a tooth having first and second terminal portions and top and bottom edges, and a retaining element having first and second legs with end portions secured with respective terminal portions of said band member, said legs forming a substantially V-shaped cross-section along said band member, the legs of said element being contractibly deformable for contracting and clamping said band member about said tooth.

12. A dental matrix device comprising a flexible band member for being received about a tooth having first and second terminal portions and top and bottom edges, and a retaining element substantially extending between the top and bottom edges of said band member and having first and second legs with end portions secured with respective terminal portions of said band member, said legs forming a substantially V-shaped cross-section along said band member with decreasing sectional leg dimensions in moving from the top edge to the bottom edge of said band member, the legs of said element being contractibly deformable for contracting said band member into a conical section conforming with said tooth and clamping said band member about said tooth.

13. A dental matrix device comprising a flexible band member for being received about a tooth having first and second terminal portions and top and bottom edges, the lower edge of said member having a length greater than that of its top edge, and a retaining element substantially extending between the top and bottom edges of said band member and having first and second legs with end portions secured with respective terminal portions of said band member, said legs forming a substantially V-shaped cross-section along said band member with a decreasing distance between the end portions of said legs in moving from the top edge to the bottom edge of said band member, the legs of said element being contractibly deformable for contracting said band member into a conical section conforming with said tooth and clamping said band member about said tooth.

14. In a dental matrix device having a flexible band member, a retaining element adapted to be connected with a flexible band member and having top and bottom edges and first and second legs, said legs forming a substantially V-shaped cross-section of greater dimensions along the top edge than along the bottom edge of said element, said legs being contractibly deformable for contracting said band member.

15. In a dental matrix device having a flexible band member, a retaining element adapted to be connected with a flexible band member and having top and bottom edges and first and second legs with respective end portions, said legs forming a substantially V-shaped cross-section with a greater distance between their end portions along the top edge than along the bottom edge of said element, said legs being contractibly deformable for contracting said band member.

16. In a dental matrix device having a flexible band member with first and second terminal portions, a retaining element having top and bottom edges and first and second legs with respective end portions, each of the end portions of said legs being folded back on itself for engaging a respective one of a pair of terminal portions of a flexible band member, said legs forming a substantially V-shaped cross-section with a greater distance between their end portions along the top edge than along the bottom edge of said element, said legs being contractibly deformable for contracting said band member.

References Cited in the file of this patent

UNITED STATES PATENTS

| | | |
|---|---|---|
| 983,844 | Shannon | Feb. 7, 1911 |
| 1,255,109 | Russ | Jan. 29, 1918 |